US011494220B2

(12) United States Patent
Friedman et al.

(10) Patent No.: US 11,494,220 B2
(45) Date of Patent: *Nov. 8, 2022

(54) SCALABLE TECHNIQUES FOR DATA TRANSFER BETWEEN VIRTUAL MACHINES

(71) Applicant: INTEL CORPORATION, Santa Clara, CA (US)

(72) Inventors: Ben-Zion Friedman, Jerusalem (IL); Eliezer Tamir, Bait Shemesh (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,400

(22) Filed: Mar. 5, 2020

(65) Prior Publication Data

US 2020/0201668 A1 Jun. 25, 2020

Related U.S. Application Data

(63) Continuation of application No. 14/998,361, filed on Dec. 24, 2015, now Pat. No. 10,628,192.

(51) Int. Cl.

| | |
|---|---|
| ***G06F 21/00*** | (2013.01) |
| ***G06F 9/455*** | (2018.01) |
| ***G06F 9/54*** | (2006.01) |
| ***G06F 21/60*** | (2013.01) |
| ***G06F 21/53*** | (2013.01) |

(52) U.S. Cl.

CPC ............ *G06F 9/45558* (2013.01); *G06F 9/54* (2013.01); *G06F 21/53* (2013.01); *G06F 21/606* (2013.01); *G06F 2009/4557* (2013.01); *G06F 2009/45583* (2013.01)

(58) Field of Classification Search

None

See application file for complete search history.

(56) References Cited

U.S. PATENT DOCUMENTS 6,125,430 A * 9/2000 Noel .................... G06F 12/023 711/152
6,351,536 B1 * 2/2002 Sasaki .................. G06F 21/606 380/255
7,401,358 B1 * 7/2008 Christie ................ G06F 9/4403 711/163

(Continued)

FOREIGN PATENT DOCUMENTS

CN 103139159 A 6/2013
CN 104468803 A 3/2015

*Primary Examiner* — Maung T Lwin

(74) *Attorney, Agent, or Firm* — KDB Firm PLLC

(57) ABSTRACT

Scalable techniques for data transfer between virtual machines (VMs) are described. In an example embodiment, an apparatus may include circuitry and memory storing instructions for execution by the circuitry to assign each one of a plurality of shared virtual memory spaces to a respective one of a plurality of virtual machines, wherein a first shared virtual memory space of the plurality of shared virtual memory spaces is assigned to a first virtual machine of the plurality of virtual machines, write, by the first virtual machine to the first shared virtual memory space, data to be provided to a second virtual machine of the plurality of virtual machines, and read, by the second virtual machine, the data in the first shared virtual memory space.

21 Claims, 9 Drawing Sheets

(56) References Cited

U.S. PATENT DOCUMENTS

| | | | | |
|---|---|---|---|---|
| 7,739,349 | B2 * | 6/2010 | Holt | G06F 9/526<br>709/201 |
| 8,316,190 | B2 * | 11/2012 | Holt | G06F 11/1658<br>711/148 |
| 8,943,203 | B1 | 1/2015 | Lent et al. | |
| 9,619,268 | B2 * | 4/2017 | Beveridge | G06F 9/4451 |
| 9,916,456 | B2 * | 3/2018 | O'Hare | G06F 21/629 |
| 2006/0095793 | A1 * | 5/2006 | Hall | G06F 12/1408<br>713/190 |
| 2010/0161879 | A1 * | 6/2010 | Nation | G06F 12/0813<br>711/170 |
| 2010/0161908 | A1 * | 6/2010 | Nation | G06F 12/0284<br>711/147 |
| 2010/0250866 | A1 * | 9/2010 | Kojima | G06F 9/5016<br>711/152 |
| 2012/0110275 | A1 * | 5/2012 | Ganti | G06F 12/08<br>711/153 |
| 2012/0297381 | A1 | 11/2012 | Ambat et al. | |
| 2012/0304171 | A1 * | 11/2012 | Joshi | G06F 12/084<br>718/1 |
| 2014/0164791 | A1 * | 6/2014 | Chaturvedi | G06F 21/53<br>713/193 |
| 2015/0033038 | A1 * | 1/2015 | Goss | G06F 12/145<br>713/193 |
| 2015/0046661 | A1 * | 2/2015 | Gathala | G06F 12/023<br>711/147 |
| 2015/0220709 | A1 * | 8/2015 | Jung | G06F 21/45<br>713/155 |

* cited by examiner

100
Memory 104
Physical Memory Resources 114
Physical Memory Space 120-1
Physical Memory Space 120-N
Virtual Memory Resources 112
Virtual Memory Space 118-1
Virtual Memory Space 118-N
Bus 110
Circuitry 102
Host 106
Memory Mapping Info. 116
Memory Allocation Info. 122
Virtual Machine 108-1
Virtual Machine 108-N

200

300

400
402
VM #1
VM #2
VM #3
VM #4
VM #N-1
VM #N
Read
Write
Mailbox 1
Mailbox 2
Mailbox 3
Mailbox N-2
Mailbox N-1
Mailbox N
Mailbox N+1
Mailbox N+2
Mailbox 2*(N-1)-1
Mailbox 2*(N-1)
Mailbox 2*(N-1)+1
Mailbox 2*(N-1)+2
Mailbox 2*(N-1)+3
Mailbox 3*(N-1)-1
Mailbox 3*(N-1)
Mailbox 3*(N-1)+1
Mailbox 3*(N-1)+2
Mailbox 3*(N-1)+3
Mailbox 4*(N-1)-1
Mailbox 4*(N-1)
Mailbox (N-2)*(N-1)+1
Mailbox (N-2)*(N-1)+2
Mailbox (N-2)*(N-1)+3
Mailbox (N-2)*(N-1)+4
Mailbox (N-1)*(N-1)
Mailbox (N-1)*(N-1)+1
Mailbox (N-1)*(N-1)+2
Mailbox (N-1)*(N-1)+3
Mailbox (N-1)*(N-1)+4
Mailbox N*(N-1)

*FIG. 7*

*Storage Medium 700*

*Computer Executable Instructions for 600*

SCALABLE TECHNIQUES FOR DATA TRANSFER BETWEEN VIRTUAL MACHINES

CROSS-REFERENCE TO RELATED APPLICATIONS

This application is a continuation of, claims the benefit of and priority to previously filed U.S. patent application Ser. No. 14/998,361 filed Dec. 24, 2015, entitled "Scalable techniques for data transfer between virtual machines", which is hereby incorporated by reference in its entirety.

This application relates to International Patent Application entitled "SCALABLE TECHNIQUES FOR DATA TRANSFER BETWEEN VIRTUAL MACHINES," International Patent Application Serial Number PCT/US16/63692, filed Nov. 23, 2016. The contents of the aforementioned application are incorporated herein by reference.

TECHNICAL FIELD

Embodiments herein generally relate to virtual machine management, memory allocation, input/output (I/O), and networking.

BACKGROUND

In a variety of contexts, it may be desirable that a host be configured to support the transfer of data between virtual machines (VMs) running on that host. For example, providing inter-VM data transfer support may enable the implementation of a security appliance VM that inspects changes to filesystem data and interposes itself between a client VM and one or more storage resources, such as local direct-attached storage, network-attached storage (NAS), and/or storage area network (SAN) storage resources. Such a security appliance VM might be configured, for example, to prevent malware from being loaded from storage and/or to prevent the client VM from storing known malicious content to the filesystem.

BRIEF DESCRIPTION OF THE DRAWINGS

FIG. 7 illustrates an embodiment of a storage medium.

DETAILED DESCRIPTION

Various embodiments may be generally directed to scalable techniques for data transfer between virtual machines (VMs). In an example embodiment, an apparatus may comprise circuitry, a virtual machine management component for execution by the circuitry to define a plurality of public virtual memory spaces and assign each one of the plurality of public virtual memory spaces to a respective one of a plurality of VMs including a first VM and a second VM, and a virtual machine execution component for execution by the circuitry to execute a first virtual machine process corresponding to the first VM and a second virtual machine process corresponding to the second VM, the first virtual machine process to identify data to be provided to the second VM by the first VM and provide the data to the second VM by writing to a public virtual memory space assigned to the first VM. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
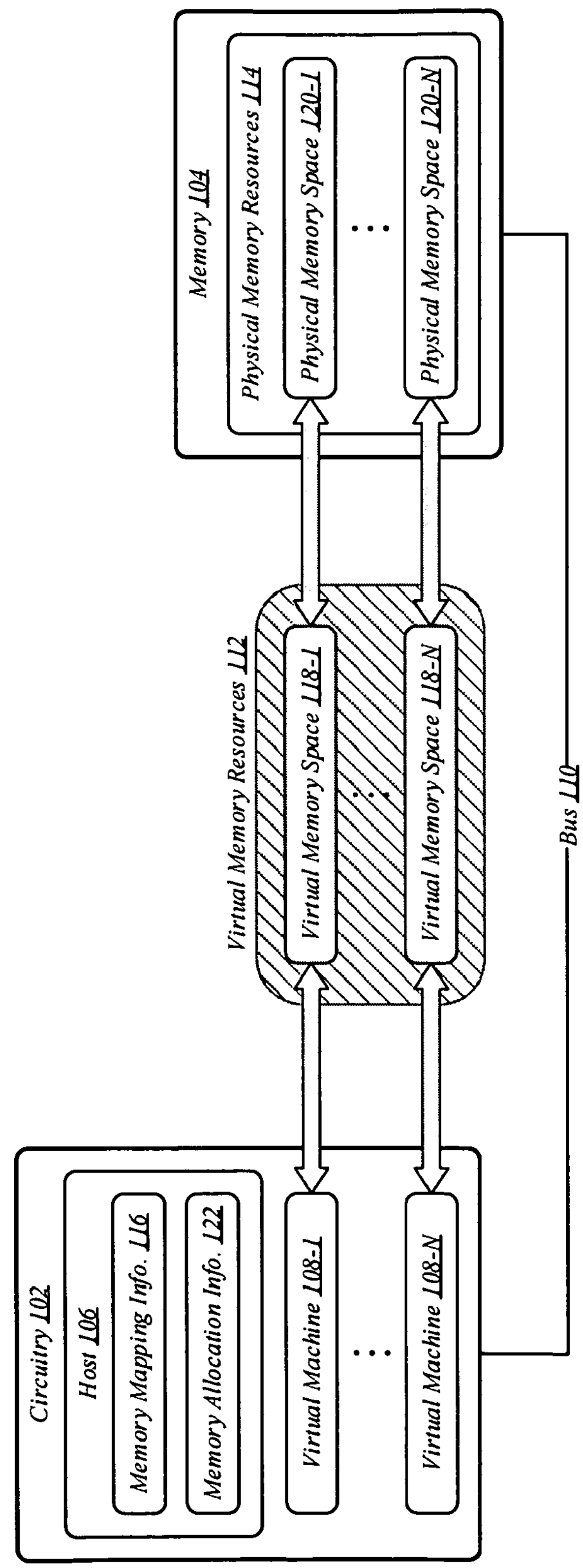
FIG. 1 illustrates an embodiment of a first operating environment.

FIG. 1 illustrates an example of an operating environment 100 that may be representative of various embodiments. In operating environment 100, circuitry 102 may run a plural number N of virtual machines 108-1 to 108-N. In some embodiments, each of virtual machines 108-1 to 108-N may comprise a separate respective operating system (OS) running on circuitry 102. In various embodiments, circuitry 102 may comprise circuitry of a processor or logic device. In some embodiments, circuitry 102 may be communicatively coupled with memory 104, which may generally comprise machine-readable or computer-readable storage media capable of storing data. In various embodiments, circuitry 102 may be communicatively coupled with some or all of memory 104 via a bus 110. In some embodiments, some or all of memory 104 may be included on a same integrated circuit as circuitry 102. In various embodiments, some or all of memory 104 may be disposed on an integrated circuit or other medium, for example a hard disk drive, that is external to the integrated circuit of circuitry 102. The embodiments are not limited in this context.

In some embodiments, a host 106 may generally be responsible for creating and managing virtual machines that are implemented using circuitry 102. In various embodiments, host 106 may comprise a host OS, and each of virtual machines 108-1 to 108-N may comprise a respective guest OS running inside that host OS. In some embodiments, host 106 may comprise a hypervisor. In various embodiments, host 106 may generally be responsible for allocating memory resources for use by virtual machines 108-1 to 108-N. In some embodiments, host 106 may allocate memory resources in accordance with a virtual memory scheme. In various embodiments, according to such a virtual memory scheme, host 106 may associate a set of virtual memory resources 112 with a set of physical memory resources 114 comprised in memory 104. In some embodiments, host 106 may map virtual memory addresses that correspond to virtual memory resources 112 to physical memory addresses that correspond to physical memory resources 114. In various embodiments, host 106 may maintain memory mapping information 116 that identifies the mappings that it has defined between particular virtual memory resources and particular physical memory resources. In some embodiments, host 106 may implement a paged virtual memory scheme, according to which it may allocate virtual memory resources 112 in units of virtual memory pages. In various such embodiments, memory mapping information 116 may be comprised in a page table that identifies mappings between pages of virtual memory and particular physical memory resources 114. The embodiments are not limited in this context.

In some embodiments, host 106 may allocate respective virtual memory spaces 118-1 to 118-N to virtual machines 108-1 to 108-N. In various embodiments, each of virtual memory spaces 118-1 to 118-N may comprise a respective subset of the virtual memory resources 112 that host 106 may associate with physical memory resources 114. In some embodiments in which host 106 implements a paged virtual memory scheme, each of virtual memory spaces 118-1 to 118-N may comprise a respective set of one or more pages of virtual memory. In various embodiments, for each of virtual memory spaces 118-1 to 118-N, memory mapping information 116 may identify a respective physical memory space 120-1 to 120-N. In some embodiments, each of physical memory spaces 120-1 to 120-N may comprise a set of physical memory resources that correspond to the set of virtual memory resources comprised in the virtual memory space that maps to that physical memory space. The embodiments are not limited in this context.

In various embodiments, host 106 may generate and/or maintain memory allocation information 122. In some embodiments, memory allocation information 122 may generally comprise information that host 106 may use to track the various virtual memory spaces that it may define and/or to track the various virtual machines to which it may assign such virtual memory spaces. In some embodiments, memory allocation information 122 may include information indicating the respective particular sets of virtual memory resources 112 comprised in each of virtual memory spaces 118-1 to 118-N. In various embodiments, memory allocation information 122 may include information indicating the respective virtual machines 108-1 to 108-N to which each of virtual memory spaces 118-1 to 118-N has been assigned. In some embodiments, each of virtual machines 108-1 to 108-N may only be permitted to access virtual memory resources comprised within its respective assigned virtual memory space as specified by memory allocation information 122. The embodiments are not limited in this context.

It is worthy of note that in various embodiments, circuitry 102 may include circuitry of multiple devices. For example, in some embodiments, circuitry 102 may comprise circuitry of multiple processors or logic devices. In various embodiments, a given virtual machine may run on more than one such processor or logic device at once. In some embodiments in which circuitry 102 is implemented using circuitry of multiple devices, those multiple devices may be substantially collocated. For example, in various embodiments, circuitry 102 may comprise circuitry of multiple processors of a same server. In other embodiments, circuitry 102 may comprise circuitry of respective processors/logic devices of multiple different servers. In some such embodiments, virtual machines running on the respective processors/logic devices of the various servers may be networked using network connectivity between those servers. The embodiments are not limited in this context.

Figure 2:
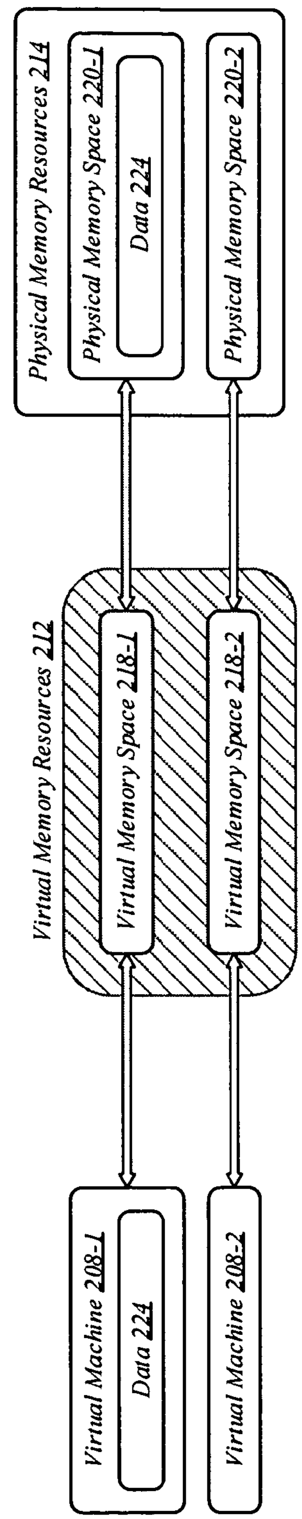
FIG. 2 illustrates an embodiment of a second operating environment.

FIG. 2 illustrates an example of an operating environment 200 that may be representative of various embodiments. In operating environment 200, virtual memory spaces 218-1 and 218-2 may be defined that comprise respective sets of virtual memory resources 212. In some embodiments, the set of virtual memory resources 212 comprised in virtual memory space 218-1 may map to a set of physical memory resources 214 comprised in a physical memory space 220-1. In various embodiments, the set of virtual memory resources 212 comprised in virtual memory space 218-2 may map to a set of physical memory resources 214 comprised in a physical memory space 220-2. In some embodiments, virtual memory space 218-1 may be assigned to a virtual machine 208-1, and virtual memory space 218-2 may be assigned to a virtual machine 208-2. In various embodiments, virtual machine 208-1 may be permitted to access virtual memory resources comprised in virtual memory space 218-1 but not virtual memory resources comprised in virtual memory space 218-2, and virtual machine 208-2 may be permitted to access virtual memory resources comprised in virtual memory space 218-2 but not virtual memory resources comprised in virtual memory space 218-1.

In some embodiments, virtual machine 208-1 may elect to write data 224 to memory. In various embodiments, virtual machine 208-1 may write data 224 to virtual memory locations comprised in virtual memory space 218-1, and as a result, data 224 may be stored in physical memory resources comprised within physical memory space 220-1. In some embodiments, it may be desirable that virtual machine 208-2 be provided with data 224. However, in various embodiments, virtual machine 208-2 may not be permitted to access virtual memory resources comprised in virtual memory space 218-1, and thus may be unable to retrieve data 224 from physical memory space 220-1. In some such embodiments, virtual machine 208-1 may not be permitted to access virtual memory resources comprised in virtual memory space 218-2, and thus may be unable to store data 224 within physical memory resources of the physical memory space 220-2 that is accessible to virtual machine 208-2 via virtual memory space 218-2. The embodiments are not limited to this example.

Figure 3:
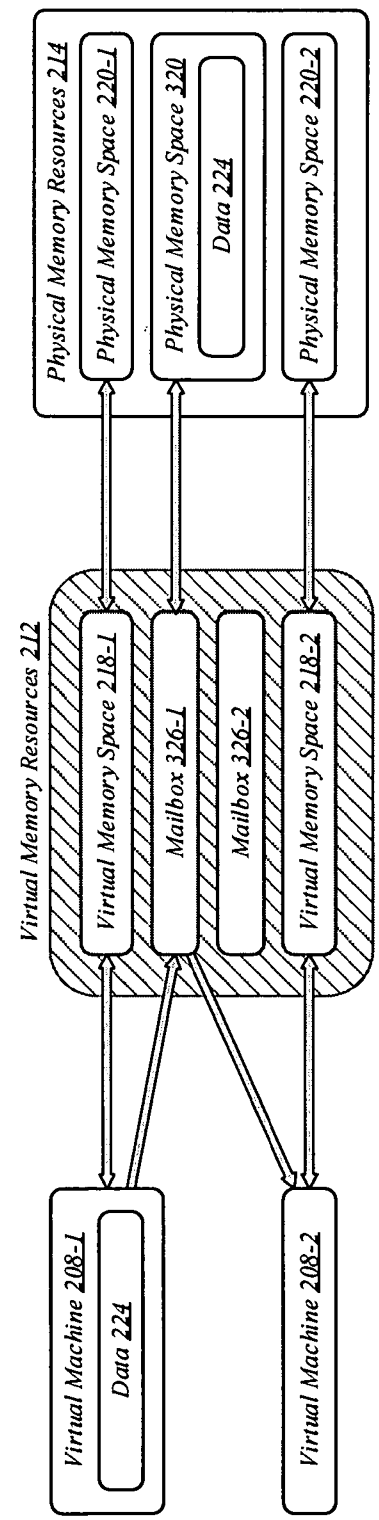
FIG. 3 illustrates an embodiment of a third operating environment.

FIG. 3 illustrates an example of an operating environment 300 that may be representative of various embodiments. More particularly, operating environment 300 may be representative of the implementation of a mailbox-based scheme for supporting data transfer between virtual machines. In operating environment 300, respective sets of virtual memory resources may be designated for use as mailboxes 326-1 and 326-2. In some embodiments, mailbox 326-1 may comprise a virtual memory space that is specifically designated for use by virtual machine 208-1 to provide data to virtual machine 208-2. In various embodiments, mailbox 326-2 may comprise a virtual memory space that is specifically designated for use by virtual machine 208-2 to provide data to virtual machine 208-1. In some embodiments, only virtual machine 208-1 may be permitted to write to mailbox 326-1, and only virtual machine 208-2 may be permitted to read any data that virtual machine 208-1 may write to mailbox 326-1. In various embodiments, only virtual machine 208-2 may be permitted to write to mailbox 326-2, and only virtual machine 208-1 may be permitted to read any data that virtual machine 208-2 may write to mailbox 326-2. The embodiments are not limited in this context.

In some embodiments, in order to provide data 224 to virtual machine 208-2, virtual machine 208-1 may write data 224 to virtual memory resources comprised in mailbox 326-1. In various embodiments, the virtual memory resources of mailbox 326-1 may map to physical memory resources comprised in a physical memory space 320. In some embodiments, when virtual machine 208-1 writes data 224 to virtual memory resources comprised in mailbox 326-1, data 224 may be stored in physical memory resources comprised within physical memory space 320. In various embodiments, the virtual memory resources of mailbox 326-2 may map to physical memory resources comprised in a physical memory space other than physical memory space 220-1, physical memory space 220-2, or physical memory space 320. The embodiments are not limited in this context.

Figure 4:
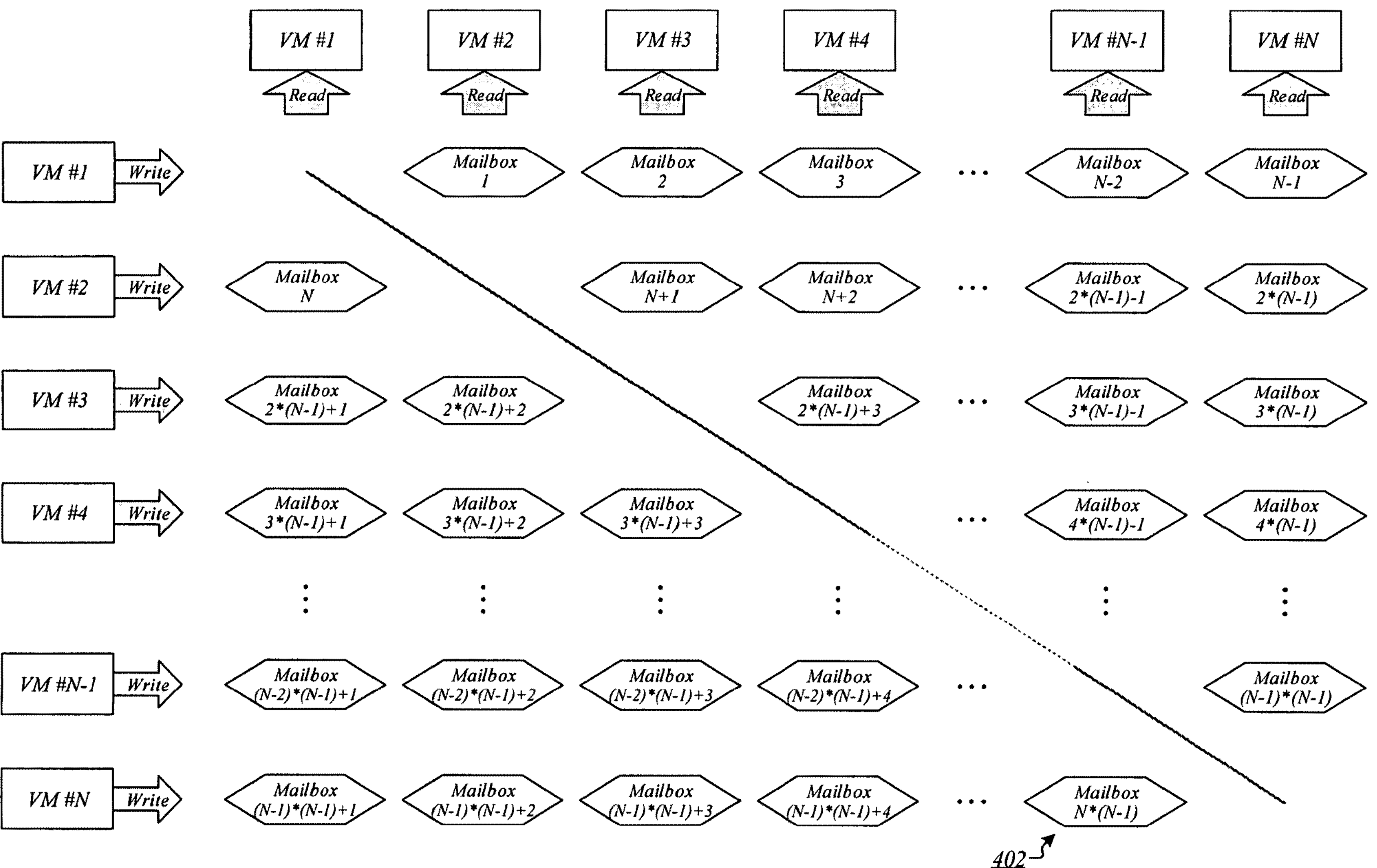
FIG. 4 illustrates an embodiment of an assignment scheme.

FIG. 4 illustrates an example of an assignment scheme 400. Assignment scheme 400 may be representative of a generalization of the mailbox-based scheme discussed above in reference to operating environment 300 of FIG. 3. According to assignment scheme 400, a pool of mailboxes is defined, each of which may correspond to a different respective set of virtual memory resources. The pool of mailboxes includes a respective dedicated mailbox for each possible combination of data transferor and data transferee with respect to a pool of N virtual machines VM #1 to VM #N. Each virtual machine is assigned a set of N−1 mailboxes, to each of which it may write data to be provided to a respective one of the N−1 other virtual machines in the pool. Each virtual machine is able to read data from each of another set of N−1 mailboxes, each of which may be written to by a respective one of the N−1 other virtual machines in the pool in order to provide data to that virtual machine.

Each row of mailboxes in FIG. 4 comprises the mailboxes to which a given virtual machine is able to write. For example, the first row comprises the N−1 mailboxes to which VM #1 is able to write, the second row comprises the N−1 mailboxes to which VM #2 is able to write, and so forth. Each column of mailboxes in FIG. 4 comprises the mailboxes from which a given virtual machine is able to read. For example, the first column comprises the N−1 mailboxes from which VM #1 is able to read, the second row comprises the N−1 mailboxes from which VM #2 is able to read, and so forth. The pool of mailboxes in FIG. 4 is numbered in ascending order, and from left to write in row-wise fashion. For example, the first row comprises mailboxes 1 to N−1, the second row comprises mailboxes N to 2*(N−1), and so forth. The last mailbox in the pool—which is highlighted as element 402—is mailbox N*(N−1). Thus, a total of N*(N−1) mailboxes are required to implement assignment scheme 400 for a pool of N virtual machines. As such, according to assignment scheme 400, the number of required mailboxes increases as the square of the number of virtual machines in the pool.

In some embodiments, each mailbox in FIG. 4 may correspond to a respective virtual memory buffer of size M. In various embodiments, the total amount of virtual memory space $M_{TOT}$ that is required to house the various mailboxes of the mailbox pool may be equal to M*N*(N−1), and thus $M_{TOT}$ may increase in proportion to the square of the number of virtual machines N. In various embodiments, there may be a minimum permitted value of the buffer size M. For example, in some embodiments, the minimum permitted buffer size may be 4 kilobytes. In some embodiments, for larger values of N, the value of $M_{TOT}$ may exceed the amount of virtual memory space that can be allocated to the mailbox pool without negatively impacting performance. In various embodiments, assignment scheme 400 may thus not be feasibly scalable for implementation in conjunction with larger virtual machine pools.

Figure 5:
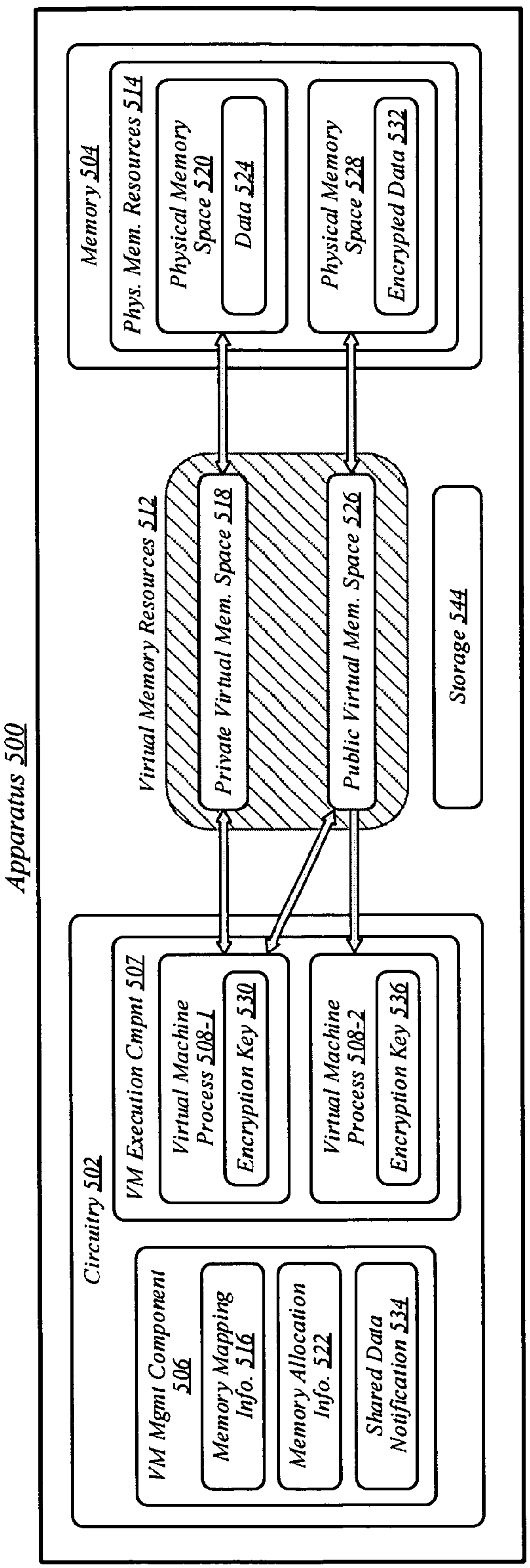
FIG. 5 illustrates an embodiment of an apparatus.

FIG. 5 illustrates an example of an apparatus 500 that may implement one or more scalable techniques for data transfer between virtual machines in some embodiments. According to various such techniques, a pool of N "outboxes" may be defined for a pool of N virtual machines, and each of the N outboxes may be assigned to a respective one of the N virtual machines. As shown in FIG. 5, apparatus 500 comprises multiple elements including circuitry 502, memory 504, and storage 544. The embodiments, however, are not limited to the type, number, or arrangement of elements shown in this figure.

In some embodiments, apparatus 500 may comprise circuitry 502. Circuitry 502 may be arranged to execute one or more software or firmware implemented modules or components, which may include a virtual machine management component 506 and a virtual machine execution component 507. In various embodiments, circuitry 502 may comprise circuitry of a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). In some embodiments, circuitry 502 may comprise circuitry of a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, circuitry 502 may be implemented using any of various commercially available processors, including—without limitation—AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. The embodiments are not limited in this context.

In various embodiments, apparatus 500 may comprise or be arranged to communicatively couple with memory 504. Memory 504 may be implemented using any machine-readable or computer-readable media capable of storing data, including both volatile and non-volatile memory. For example, memory 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 504 may be included on the same integrated circuit as circuitry 502, or alternatively some portion or all of memory 504 may be disposed on an integrated circuit or other medium, for example a hard disk drive, that is external to the integrated circuit of circuitry 502. Although memory 504 is comprised within apparatus 500 in FIG. 5, memory 504 may be external to apparatus 500 in some embodiments. The embodiments are not limited in this context.

In various embodiments, apparatus 500 may comprise storage 544. Storage 544 may be implemented as a nonvolatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 544 may include technology to increase the storage performance enhanced protection for valuable digital media when multiple hard drives are included, for example. Further examples of storage 544 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In some embodiments, virtual machine execution component 507 may be executed by circuitry 502 to run one or more virtual machines. In various embodiments, virtual machine execution component 507 may be executed by circuitry 502 to instantiate and execute a respective virtual machine process for each such virtual machine. In the example of FIG. 5, virtual machine execution component 507 may execute a virtual machine process 508-1 that corresponds to a first virtual machine and a virtual machine process 508-2 that corresponds to a second virtual machine. In some embodiments, virtual machine process 508-1 may correspond to virtual machine 208-1 of FIGS. 2 and 3, and virtual machine process 508-2 may correspond to virtual machine 208-2 of FIGS. 2 and 3. The embodiments are not limited in this context.

In various embodiments, virtual machine management component 506 may generally be responsible for allocating memory resources for use by the virtual machine processes that may be instantiated and executed by virtual machine execution component 507. In some embodiments, virtual machine management component 506 may allocate memory resources in accordance with a virtual memory scheme. In various embodiments, according to such a virtual memory scheme, virtual machine management component 506 may associate a set of virtual memory resources 512 with a set of physical memory resources 514 comprised in memory 504. In some embodiments, virtual machine management component 506 may map virtual memory addresses that correspond to virtual memory resources 512 to physical memory addresses that correspond to physical memory resources 514. In various embodiments, virtual machine management component 506 may maintain memory mapping information 516 that identifies the mappings that it has defined between particular virtual memory resources and particular physical memory resources. In some embodiments, virtual machine management component 506 may implement a paged virtual memory scheme, according to which it may allocate virtual memory resources 512 in units of virtual memory pages. In various such embodiments, memory mapping information 516 may be comprised in a page table that identifies mappings between pages of virtual memory and particular physical memory resources 514. The embodiments are not limited in this context.

In some embodiments, virtual machine management component 506 may define a plurality of private virtual memory spaces, and may assign each one of the plurality of private virtual memory spaces to a respective one of a plurality of virtual machines. In various embodiments, each private virtual memory space may be accessible only to the virtual machine to which it is assigned. In some embodiments, each such private virtual memory space may comprise a respective subset of the virtual memory resources 512 that virtual machine management component 506 may associate with physical memory resources 514. In various embodiments in which virtual machine management component 506 implements a paged virtual memory scheme, each private virtual memory space may comprise a respective set of one or more pages of virtual memory. In some embodiments, for each private virtual memory space, memory mapping information 516 may identify a respective physical memory space. In various embodiments, each such physical memory space may comprise a set of physical memory resources that correspond to the set of virtual memory resources comprised in the virtual memory space that maps to that physical memory space. The embodiments are not limited in this context.

In some embodiments, virtual machine management component 506 may define a private virtual memory space 518 and assign it to the virtual machine corresponding to virtual machine process 508-1. In various embodiments, private virtual memory space 518 may only be accessible to virtual machine process 508-1. In some embodiments, the virtual memory resources comprised in private virtual memory space 518 may map to physical memory resources comprised in a physical memory space 520. In various embodiments, memory mapping information 516 may include information indicating that private virtual memory space 518 corresponds to physical memory space 520. The embodiments are not limited in this context.

In some embodiments, virtual machine management component 506 may define a plurality of public virtual memory spaces, and may assign each one of the plurality of public virtual memory spaces to a respective one of a plurality of virtual machines. In various embodiments, each such public virtual memory space may comprise a virtual memory space for use by the virtual machine to which it is assigned as an "outbox" in which to store data to be provided to one or more other virtual machines. In some embodiments, each such public virtual memory space may be writable by the virtual machine to which it is assigned, and may be readable by each other one of the plurality of virtual machines. In various embodiments, each such public virtual memory space may comprise a respective subset of the virtual memory resources 512 that virtual machine management component 506 may associate with physical memory resources 514. In some embodiments in which virtual machine management component 506 implements a paged virtual memory scheme, each public virtual memory space may comprise a respective set of one or more pages of virtual memory. In various embodiments, for each public virtual memory space, memory mapping information 516 may identify a respective physical memory space. In some embodiments, each such physical memory space may comprise a set of physical memory resources that correspond to the set of virtual memory resources comprised in the virtual memory space that maps to that physical memory space. The embodiments are not limited in this context.

In various embodiments, virtual machine management component 506 may define a public virtual memory space 526 and assign it to the virtual machine corresponding to virtual machine process 508-1. In some embodiments, public virtual memory space 526 may comprise a virtual memory space for use by the virtual machine corresponding to virtual machine process 508-1 as an outbox in which to store data to be provided to one or more other virtual machines. In various embodiments, public virtual memory space 526 may be writable be virtual machine process 508-1 and may be readable by virtual machine process 508-2. In some embodiments, the virtual memory resources comprised in public virtual memory space 526 may map to physical memory resources comprised in a physical memory space 528. In various embodiments, memory mapping information 516 may include information indicating that public virtual memory space 526 corresponds to physical memory space 528. The embodiments are not limited in this context.

In some embodiments, virtual machine management component 506 may generate and/or maintain memory allocation information 522. In some embodiments, memory allocation information 522 may generally comprise information that virtual machine management component 506 may use to track the various private and public virtual memory spaces that it may define and/or to track the various virtual machines to which it may assign such virtual memory spaces. In various embodiments, memory allocation information 522 may include information indicating the respective particular sets of virtual memory resources 512 comprised in private virtual memory space 518 and public virtual memory space 526. In some embodiments, memory allocation information 522 may include information indicating that private virtual memory space 518 and public virtual memory space 526 have been assigned to the virtual machine corresponding to virtual machine process 508-1. The embodiments are not limited in this context.

In various embodiments, virtual machine process 508-1 may identify data 524 that is to be provided to the virtual machine corresponding to virtual machine process 508-2 by the virtual machine corresponding to virtual machine process 508-1. In some embodiments, virtual machine process 508-1 may retrieve data 524 from physical memory space 520. In various embodiments, virtual machine process 508-1 may provide data 524 to the virtual machine corresponding to virtual machine process 508-2 by writing to public virtual memory space 526.

In some embodiments, virtual machine processes 508-1 and 508-2 may correspond to two virtual machines among a pool of a larger number of virtual machines. In such embodiments, public virtual memory space 526 may be readable both by virtual machine process 508-2 and by virtual machine processes corresponding to other virtual machines in the pool. In various embodiments, in order to preserve the security of data 524, virtual machine process 508-1 may encrypt data 524 to before writing to public virtual memory space 526. In some embodiments, virtual machine process 508-1 may encrypt data 524 using an encryption key 530 in order to obtain encrypted data 532, and may write encrypted data 532 to public virtual memory space 526.

In various embodiments, encryption key 530 may comprise a symmetric encryption key. In some such embodiments, encryption key 530 may comprise an Advanced Encryption Standard (AES) symmetric encryption key. In various embodiments, encryption key 530 may comprise a dedicated encryption key for use in encryption and decryption of data being provided to the virtual machine corresponding to virtual machine process 508-2 by the virtual machine corresponding to virtual machine process 508-1. In some embodiments, encryption key 530 may comprise an asymmetric encryption key. In various embodiments, encryption key 530 may comprise a public key of a private/public key pair. In some such embodiments, encryption key 530 may comprise a dedicated key for use in encryption of data being provided to the virtual machine corresponding to virtual machine process 508-2. In various embodiments, encryption key 530 may comprise a public key selected by the virtual machine corresponding to virtual machine process 508-2. In some such embodiments, virtual machine management component 506 may publish encryption key 530 on behalf of the virtual machine corresponding to virtual machine process 508-2. The embodiments are not limited in this context.

In various embodiments, virtual machine process 508-2 may retrieve encrypted data 532 from public virtual memory space 526 and decrypt encrypted data 532 using an encryption key 536. In some embodiments, virtual machine management component 506 may generate a shared data notification 534 to notify the virtual machine corresponding to virtual machine process 508-2 that public virtual memory space 526 contains encrypted data 532 to be provided to that virtual machine. In various such embodiments, virtual machine process 508-2 may retrieve and decrypt encrypted data 532 in response to shared data notification 534. In some embodiments, shared data notification 534 may identify one or more virtual memory pages comprising encrypted data 532. In various embodiments, shared data notification 534 may identify the virtual machine corresponding to virtual machine process 508-1 as the source of encrypted data 532. In some embodiments, shared data notification 534 may identify the virtual machine corresponding to virtual machine process 508-2 as the intended recipient of encrypted data 532. The embodiments are not limited in this context.

In various embodiments, encryption key 536 may comprise a symmetric encryption key. In some such embodiments, encryption key 536 may comprise an AES symmetric encryption key. In various embodiments, encryption key 536 may comprise a dedicated encryption key for use in encryption and decryption of data being provided to the virtual machine corresponding to virtual machine process 508-2 by the virtual machine corresponding to virtual machine process 508-1. In some embodiments, encryption key 536 may comprise a same symmetric encryption key as encryption key 530. In various embodiments, encryption key 536 may comprise an asymmetric encryption key. In some embodiments, encryption key 536 may comprise a private key of a private/public key pair. In various such embodiments, encryption key 536 may comprise a private key of a private/public key pair with respect to which encryption key 530 comprises the public key. In some embodiments, encryption key 536 may comprise a dedicated key for use in decryption of encrypted data being provided to the virtual machine corresponding to virtual machine process 508-2. The embodiments are not limited in this context.

It is worthy of note that in some embodiments in which encryption keys 530 and 536 comprise a same symmetric encryption key, asymmetric encryption may be used in conjunction with providing that symmetric encryption key to virtual machine process 508-2. For example, in various embodiments, virtual machine process 508-1 may randomly select a symmetric encryption key as encryption key 530 and may encrypt encryption key 530 using a public key of a private/public key pair to obtain an encrypted symmetric encryption key. In such embodiments, virtual machine process 508-2 may decrypt the encrypted symmetric encryption key using a public key of the private/public key pair, and may identify the symmetric encryption key as encryption key 536. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
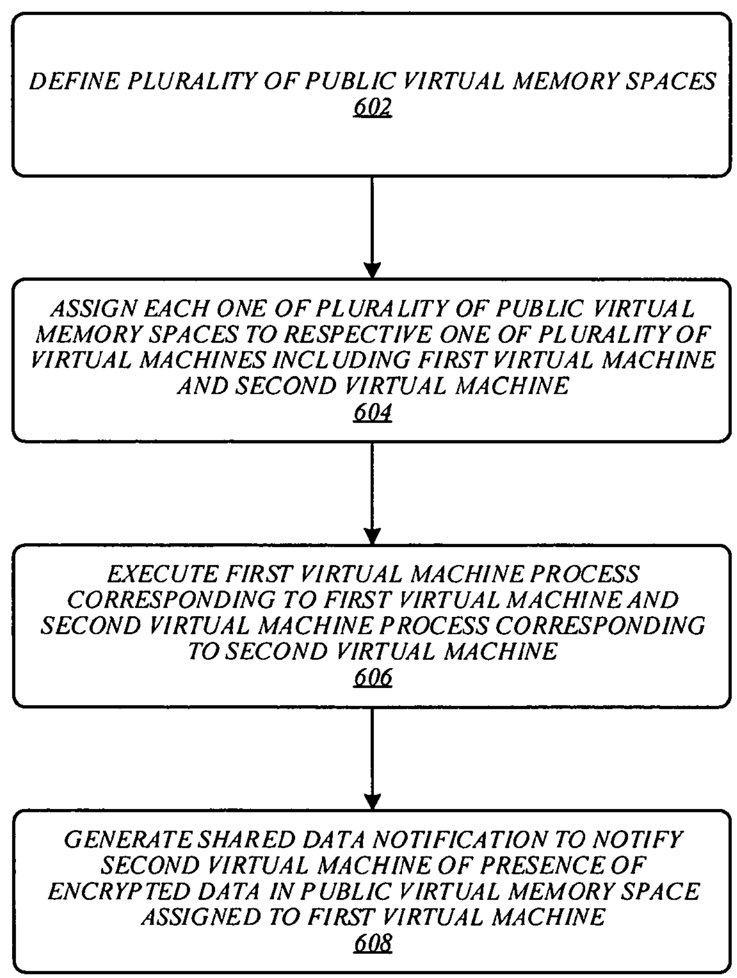
FIG. 6 illustrates an embodiment of a logic flow.

FIG. 6 illustrates an example of a logic flow 600 that may be representative of the implementation of one or more of the disclosed scalable techniques for data transfer between virtual machines according to various embodiments. For example, logic flow 600 may be representative of operations that may be performed in some embodiments by circuitry 502 in apparatus 500 of FIG. 5. As shown in FIG. 6, a plurality of public virtual memory spaces may be defined at 602. For example, virtual machine management component 506 of FIG. 5 may define a plurality of public virtual memory spaces, which may include public virtual memory space 526. At 604, each one of the plurality of public virtual memory spaces may be assigned to a respective one of a plurality of virtual machines including a first virtual machine and a second virtual machine. For example, virtual machine management component 506 of FIG. 5 may assign each one of a plurality of public virtual memory spaces to a respective one of a plurality of virtual machines including a virtual machine corresponding to virtual machine process 508-1 and a virtual machine corresponding to virtual machine process 508-2.

At 606, a first virtual machine process may be executed that corresponds to the first virtual machine, and a second virtual machine process may be executed that corresponds to the second virtual machine. For example, virtual machine management component 506 of FIG. 5 may execute virtual machine process 508-2, which may correspond to a first virtual machine, and may execute virtual machine process 508-2, which may correspond to a second virtual machine. At 608, a shared data notification may be generated to notify the second virtual machine of the presence of encrypted data in a public virtual memory space assigned to the first virtual machine. For example, virtual machine management component 506 of FIG. 5 may generate a shared data notification 534 in order to notify the virtual machine corresponding to virtual machine process 508-2 of the presence of encrypted data 532 in a public virtual memory space 526 assigned to the virtual machine corresponding to virtual machine process 508-1. The embodiments are not limited to these examples.

Figure 7:
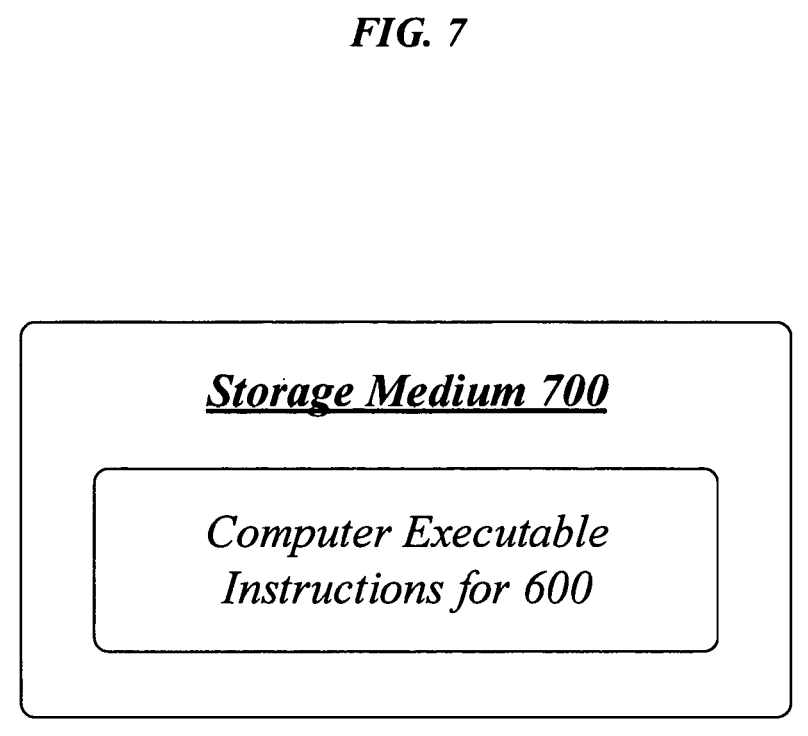

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
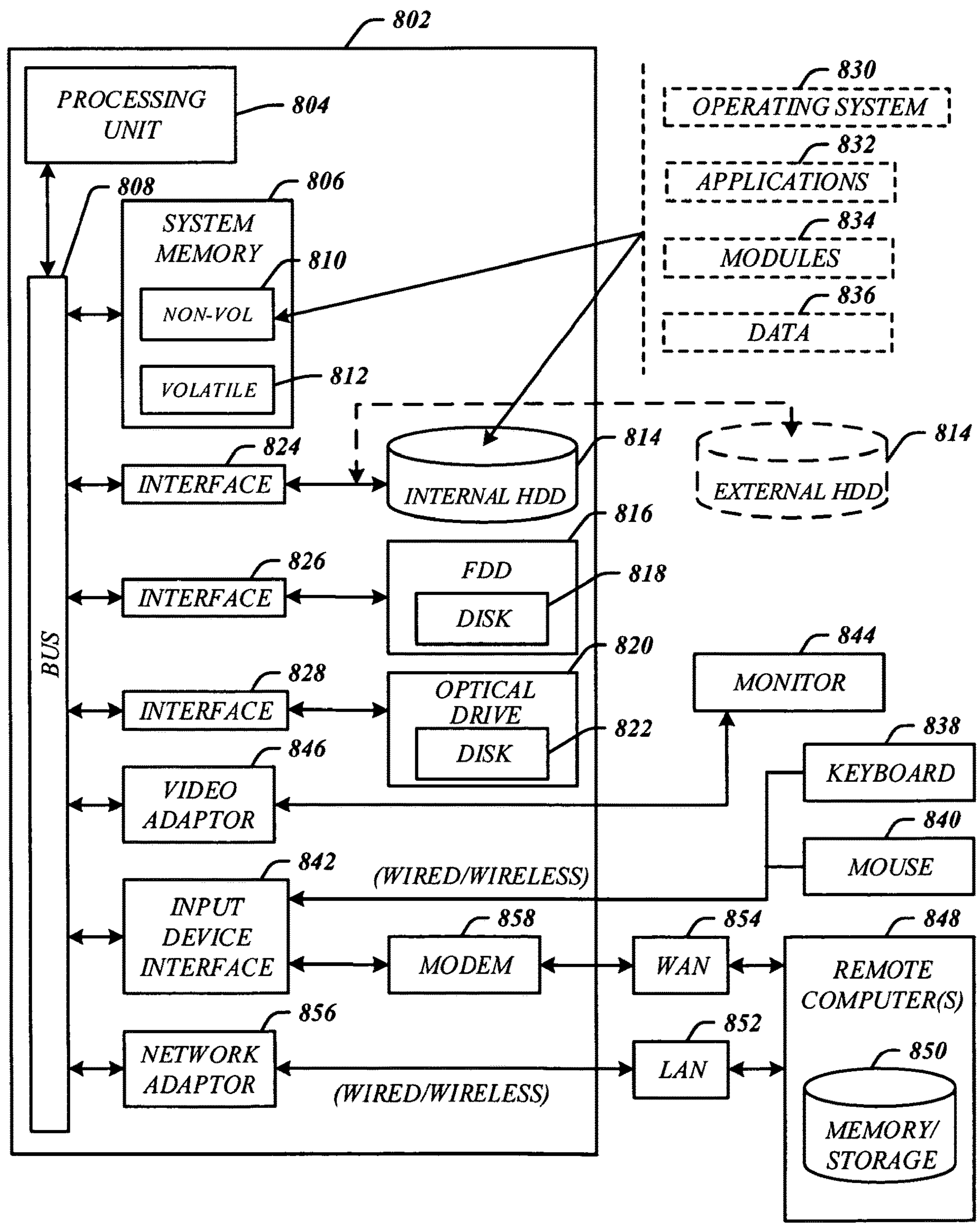
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatus 500 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, various applications and/or components of apparatus 500 of FIG. 5.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions). In some embodiments, communications over such a wired network may be performed via a fabric interface, such as an InfiniB and interface or an Intel® Omni-Path Fabric interface. The embodiments are not limited to these examples.

Figure 9:
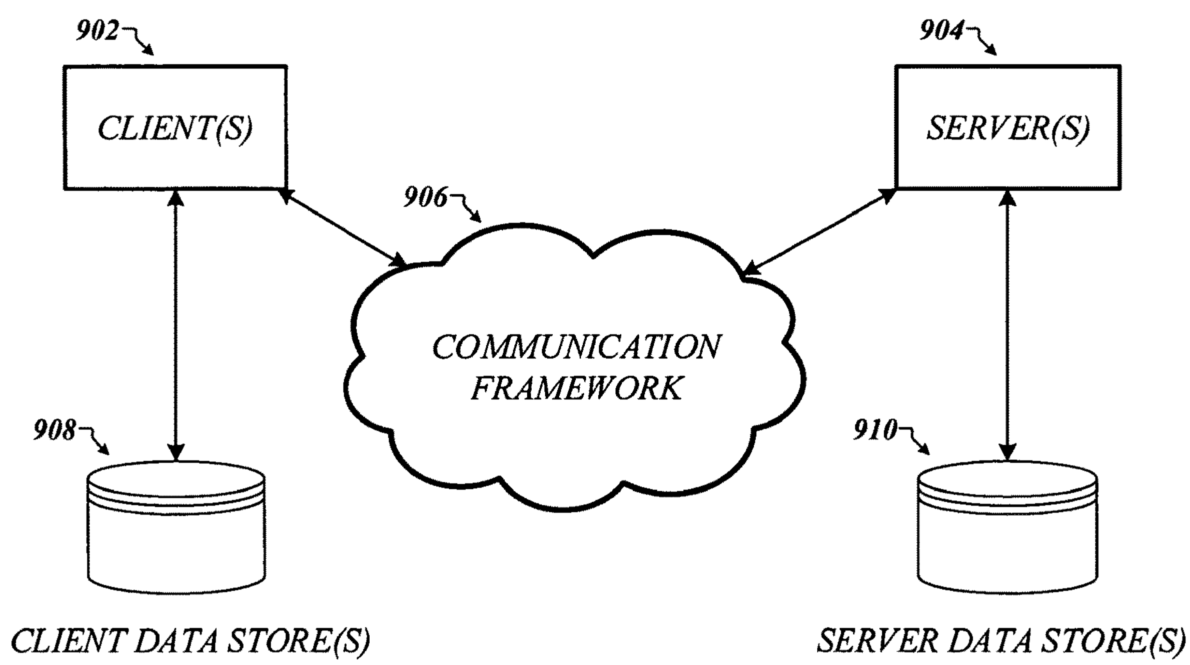
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. Any one of clients 902 and/or servers 904 may implement one or more of apparatus 500 of FIG. 5, logic flow 600 of FIG. 6, storage medium 700 of FIG. 7, and computing architecture 800 of FIG. 8. In various embodiments, apparatus 500 of FIG. 5 may be implemented in one or more switching devices and/or routing devices in communication framework 906.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising circuitry, a virtual machine management component for execution by the circuitry to define a plurality of public virtual memory spaces, and assign each one of the plurality of public virtual memory spaces to a respective one of a plurality of virtual machines including a first virtual machine and a second virtual machine, and a virtual machine execution component for execution by the circuitry to execute a first virtual machine process corresponding to the first virtual machine and a second virtual machine process corresponding to the second virtual machine, the first virtual machine process to identify data to be provided to the second virtual machine by the first virtual machine and provide the data to the second virtual machine by writing to a public virtual memory space assigned to the first virtual machine.

Example 2 is the apparatus of Example 1, the first virtual machine process to retrieve the data from a private virtual memory space of the first virtual machine.

Example 3 is the apparatus of any of Examples 1 to 2, the first virtual machine process to encrypt the data and write the encrypted data to the public virtual memory space assigned to the first virtual machine.

Example 4 is the apparatus of Example 3, the first virtual machine process to encrypt the data using a symmetric encryption key.

Example 5 is the apparatus of Example 4, the symmetric encryption key to comprise an Advanced Encryption Standard (AES) encryption key.

Example 6 is the apparatus of any of Examples 4 to 5, the symmetric encryption key to comprise a dedicated key for use in encryption and decryption of data to be provided to the second virtual machine by the first virtual machine.

Example 7 is the apparatus of Example 1, the first virtual machine process to encrypt the data using an asymmetric encryption key.

Example 8 is the apparatus of Example 7, the asymmetric key to comprise a public key of a private/public key pair.

Example 9 is the apparatus of Example 8, the public key to comprise a dedicated key for use in encryption of data to be provided to the second virtual machine.

Example 10 is the apparatus of any of Examples 8 to 9, the second virtual machine process to decrypt the encrypted data using a private key of the private/public key pair.

Example 11 is the apparatus of Example 10, the private key to comprise a dedicated key for use in decryption of encrypted data provided to the second virtual machine.

Example 12 is the apparatus of any of Examples 1 to 11, the second virtual machine process to obtain the data by accessing the public virtual memory space assigned to the first virtual machine.

Example 13 is the apparatus of Example 12, the first virtual machine process to encrypt the data and write the encrypted data to the public virtual memory space assigned to the first virtual machine, the second virtual machine process to retrieve the encrypted data from the public virtual memory space assigned to the first virtual machine and decrypt the encrypted data.

Example 14 is the apparatus of Example 13, the second virtual machine process to decrypt the encrypted data using a symmetric encryption key.

Example 15 is the apparatus of Example 14, the symmetric encryption key to comprise an Advanced Encryption Standard (AES) encryption key.

Example 16 is the apparatus of any of Examples 14 to 15, the symmetric encryption key to comprise a dedicated key for use in encryption and decryption of data to be provided to the second virtual machine by the first virtual machine.

Example 17 is the apparatus of Example 13, the second virtual machine process to decrypt the encrypted data using an asymmetric encryption key.

Example 18 is the apparatus of Example 17, the asymmetric key to comprise a private key of a private/public key pair.

Example 19 is the apparatus of Example 18, the private key to comprise a dedicated key for use in decryption of encrypted data provided to the second virtual machine.

Example 20 is the apparatus of any of Examples 18 to 19, the first virtual machine process to encrypt the data using a public key of the private/public key pair.

Example 21 is the apparatus of Example 20, the public key to comprise a dedicated public key for use in encryption of data to be provided to the second virtual machine.

Example 22 is the apparatus of any of Examples 20 to 21, the virtual machine management component for execution by the circuitry to publish the public key on behalf of the second virtual machine.

Example 23 is the apparatus of any of Examples 13 to 22, the virtual machine management component for execution by the circuitry to generate a shared data notification to notify the second virtual machine of the presence of the encrypted data in the public virtual memory space assigned to the first virtual machine.

Example 24 is the apparatus of Example 23, the shared data notification to identify one or more virtual memory pages comprising the encrypted data.

Example 25 is the apparatus of any of Examples 23 to 24, the shared data notification to identify the first virtual machine as a source of the encrypted data.

Example 26 is the apparatus of any of Examples 23 to 25, the shared data notification to identify the second virtual machine as an intended recipient of the encrypted data.

Example 27 is the apparatus of any of Examples 23 to 26, the second virtual machine process to retrieve and decrypt the encrypted data in response to the shared data notification.

Example 28 is a system, comprising an apparatus according to any of Examples 1 to 27, and at least one network interface.

Example 29 is a method, comprising defining a plurality of public virtual memory spaces, assigning each one of the plurality of public virtual memory spaces to a respective one of a plurality of virtual machines including a first virtual machine and a second virtual machine, and executing, by processing circuitry, a first virtual machine process corresponding to the first virtual machine and a second virtual machine process corresponding to the second virtual machine, the first virtual machine process to identify data to be provided to the second virtual machine by the first virtual machine and provide the data to the second virtual machine by writing to a public virtual memory space assigned to the first virtual machine.

Example 30 is the method of Example 29, the first virtual machine process to retrieve the data from a private virtual memory space of the first virtual machine.

Example 31 is the method of any of Examples 29 to 30, the first virtual machine process to encrypt the data and write the encrypted data to the public virtual memory space assigned to the first virtual machine.

Example 32 is the method of Example 31, the first virtual machine process to encrypt the data using a symmetric encryption key.

Example 33 is the method of Example 32, the symmetric encryption key to comprise an Advanced Encryption Standard (AES) encryption key.

Example 34 is the method of any of Examples 32 to 33, the symmetric encryption key to comprise a dedicated key for use in encryption and decryption of data to be provided to the second virtual machine by the first virtual machine.

Example 35 is the method of Example 29, the first virtual machine process to encrypt the data using an asymmetric encryption key.

Example 36 is the method of Example 35, the asymmetric key to comprise a public key of a private/public key pair.

Example 37 is the method of Example 36, the public key to comprise a dedicated key for use in encryption of data to be provided to the second virtual machine.

Example 38 is the method of any of Examples 36 to 37, the second virtual machine process to decrypt the encrypted data using a private key of the private/public key pair.

Example 39 is the method of Example 38, the private key to comprise a dedicated key for use in decryption of encrypted data provided to the second virtual machine.

Example 40 is the method of any of Examples 29 to 39, the second virtual machine process to obtain the data by accessing the public virtual memory space assigned to the first virtual machine.

Example 41 is the method of Example 40, the first virtual machine process to encrypt the data and write the encrypted data to the public virtual memory space assigned to the first virtual machine, the second virtual machine process to retrieve the encrypted data from the public virtual memory space assigned to the first virtual machine and decrypt the encrypted data.

Example 42 is the method of Example 41, the second virtual machine process to decrypt the encrypted data using a symmetric encryption key.

Example 43 is the method of Example 42, the symmetric encryption key to comprise an Advanced Encryption Standard (AES) encryption key.

Example 44 is the method of any of Examples 42 to 43, the symmetric encryption key to comprise a dedicated key for use in encryption and decryption of data to be provided to the second virtual machine by the first virtual machine.

Example 45 is the method of Example 41, the second virtual machine process to decrypt the encrypted data using an asymmetric encryption key.

Example 46 is the method of Example 45, the asymmetric key to comprise a private key of a private/public key pair.

Example 47 is the method of Example 46, the private key to comprise a dedicated key for use in decryption of encrypted data provided to the second virtual machine.

Example 48 is the method of any of Examples 46 to 47, the first virtual machine process to encrypt the data using a public key of the private/public key pair.

Example 49 is the method of Example 48, the public key to comprise a dedicated public key for use in encryption of data to be provided to the second virtual machine.

Example 50 is the method of any of Examples 48 to 49, comprising publishing the public key on behalf of the second virtual machine.

Example 51 is the method of any of Examples 41 to 50, comprising generating a shared data notification to notify the second virtual machine of the presence of the encrypted data in the public virtual memory space assigned to the first virtual machine.

Example 52 is the method of Example 51, the shared data notification to identify one or more virtual memory pages comprising the encrypted data.

Example 53 is the method of any of Examples 51 to 52, the shared data notification to identify the first virtual machine as a source of the encrypted data.

Example 54 is the method of any of Examples 51 to 53, the shared data notification to identify the second virtual machine as an intended recipient of the encrypted data.

Example 55 is the method of any of Examples 51 to 54, the second virtual machine process to retrieve and decrypt the encrypted data in response to the shared data notification.

Example 56 is at least one computer-readable storage medium comprising a set of instructions that, in response to being executed on a computing device, cause the computing device to perform a method according to any of Examples 29 to 55.

Example 57 is an apparatus, comprising means for performing a method according to any of Examples 29 to 55.

Example 58 is a system, comprising the apparatus of Example 57, and at least one network interface.

Example 59 is at least one computer-readable storage medium comprising a set of instructions that, in response to being executed on a computing device, cause the computing device to define a plurality of public virtual memory spaces, assign each one of the plurality of public virtual memory spaces to a respective one of a plurality of virtual machines including a first virtual machine and a second virtual machine, and execute a first virtual machine process corresponding to the first virtual machine and a second virtual machine process corresponding to the second virtual machine, the first virtual machine process to identify data to be provided to the second virtual machine by the first virtual machine and provide the data to the second virtual machine by writing to a public virtual memory space assigned to the first virtual machine.

Example 60 is the at least one computer-readable storage medium of Example 59, the first virtual machine process to retrieve the data from a private virtual memory space of the first virtual machine.

Example 61 is the at least one computer-readable storage medium of any of Examples 59 to 60, the first virtual machine process to encrypt the data and write the encrypted data to the public virtual memory space assigned to the first virtual machine.

Example 62 is the at least one computer-readable storage medium of Example 61, the first virtual machine process to encrypt the data using a symmetric encryption key.

Example 63 is the at least one computer-readable storage medium of Example 62, the symmetric encryption key to comprise an Advanced Encryption Standard (AES) encryption key.

Example 64 is the at least one computer-readable storage medium of any of Examples 62 to 63, the symmetric encryption key to comprise a dedicated key for use in encryption and decryption of data to be provided to the second virtual machine by the first virtual machine.

Example 65 is the at least one computer-readable storage medium of Example 59, the first virtual machine process to encrypt the data using an asymmetric encryption key.

Example 66 is the at least one computer-readable storage medium of Example 65, the asymmetric key to comprise a public key of a private/public key pair.

Example 67 is the at least one computer-readable storage medium of Example 66, the public key to comprise a dedicated key for use in encryption of data to be provided to the second virtual machine.

Example 68 is the at least one computer-readable storage medium of any of Examples 66 to 67, the second virtual machine process to decrypt the encrypted data using a private key of the private/public key pair.

Example 69 is the at least one computer-readable storage medium of Example 68, the private key to comprise a dedicated key for use in decryption of encrypted data provided to the second virtual machine.

Example 70 is the at least one computer-readable storage medium of any of Examples 59 to 69, the second virtual machine process to obtain the data by accessing the public virtual memory space assigned to the first virtual machine.

Example 71 is the at least one computer-readable storage medium of Example 70, the first virtual machine process to encrypt the data and write the encrypted data to the public virtual memory space assigned to the first virtual machine, the second virtual machine process to retrieve the encrypted data from the public virtual memory space assigned to the first virtual machine and decrypt the encrypted data.

Example 72 is the at least one computer-readable storage medium of Example 71, the second virtual machine process to decrypt the encrypted data using a symmetric encryption key.

Example 73 is the at least one computer-readable storage medium of Example 72, the symmetric encryption key to comprise an Advanced Encryption Standard (AES) encryption key.

Example 74 is the at least one computer-readable storage medium of any of Examples 72 to 73, the symmetric encryption key to comprise a dedicated key for use in encryption and decryption of data to be provided to the second virtual machine by the first virtual machine.

Example 75 is the at least one computer-readable storage medium of Example 71, the second virtual machine process to decrypt the encrypted data using an asymmetric encryption key.

Example 76 is the at least one computer-readable storage medium of Example 75, the asymmetric key to comprise a private key of a private/public key pair.

Example 77 is the at least one computer-readable storage medium of Example 76, the private key to comprise a dedicated key for use in decryption of encrypted data provided to the second virtual machine.

Example 78 is the at least one computer-readable storage medium of any of Examples 76 to 77, the first virtual machine process to encrypt the data using a public key of the private/public key pair.

Example 79 is the at least one computer-readable storage medium of Example 78, the public key to comprise a dedicated public key for use in encryption of data to be provided to the second virtual machine.

Example 80 is the at least one computer-readable storage medium of any of Examples 78 to 79, comprising instructions that, in response to being executed on the computing device, cause the computing device to publish the public key on behalf of the second virtual machine.

Example 81 is the at least one computer-readable storage medium of any of Examples 71 to 80, comprising instructions that, in response to being executed on the computing device, cause the computing device to generate a shared data notification to notify the second virtual machine of the presence of the encrypted data in the public virtual memory space assigned to the first virtual machine.

Example 82 is the at least one computer-readable storage medium of Example 81, the shared data notification to identify one or more virtual memory pages comprising the encrypted data.

Example 83 is the at least one computer-readable storage medium of any of Examples 81 to 82, the shared data notification to identify the first virtual machine as a source of the encrypted data.

Example 84 is the at least one computer-readable storage medium of any of Examples 81 to 83, the shared data notification to identify the second virtual machine as an intended recipient of the encrypted data.

Example 85 is the at least one computer-readable storage medium of any of Examples 81 to 84, the second virtual machine process to retrieve and decrypt the encrypted data in response to the shared data notification.

Example 86 is an apparatus, comprising means for defining a plurality of public virtual memory spaces, means for assigning each one of the plurality of public virtual memory spaces to a respective one of a plurality of virtual machines including a first virtual machine and a second virtual machine, and means for executing a first virtual machine process corresponding to the first virtual machine and a second virtual machine process corresponding to the second virtual machine, the first virtual machine process to identify data to be provided to the second virtual machine by the first virtual machine and provide the data to the second virtual machine by writing to a public virtual memory space assigned to the first virtual machine.

Example 87 is the apparatus of Example 86, the first virtual machine process to retrieve the data from a private virtual memory space of the first virtual machine.

Example 88 is the apparatus of any of Examples 86 to 87, the first virtual machine process to encrypt the data and write the encrypted data to the public virtual memory space assigned to the first virtual machine.

Example 89 is the apparatus of Example 88, the first virtual machine process to encrypt the data using a symmetric encryption key.

Example 90 is the apparatus of Example 89, the symmetric encryption key to comprise an Advanced Encryption Standard (AES) encryption key.

Example 91 is the apparatus of any of Examples 89 to 90, the symmetric encryption key to comprise a dedicated key for use in encryption and decryption of data to be provided to the second virtual machine by the first virtual machine.

Example 92 is the apparatus of Example 86, the first virtual machine process to encrypt the data using an asymmetric encryption key.

Example 93 is the apparatus of Example 92, the asymmetric key to comprise a public key of a private/public key pair.

Example 94 is the apparatus of Example 93, the public key to comprise a dedicated key for use in encryption of data to be provided to the second virtual machine.

Example 95 is the apparatus of any of Examples 93 to 94, the second virtual machine process to decrypt the encrypted data using a private key of the private/public key pair.

Example 96 is the apparatus of Example 95, the private key to comprise a dedicated key for use in decryption of encrypted data provided to the second virtual machine.

Example 97 is the apparatus of any of Examples 86 to 96, the second virtual machine process to obtain the data by accessing the public virtual memory space assigned to the first virtual machine.

Example 98 is the apparatus of Example 97, the first virtual machine process to encrypt the data and write the encrypted data to the public virtual memory space assigned to the first virtual machine, the second virtual machine process to retrieve the encrypted data from the public virtual memory space assigned to the first virtual machine and decrypt the encrypted data.

Example 99 is the apparatus of Example 98, the second virtual machine process to decrypt the encrypted data using a symmetric encryption key.

Example 100 is the apparatus of Example 99, the symmetric encryption key to comprise an Advanced Encryption Standard (AES) encryption key.

Example 101 is the apparatus of any of Examples 99 to 100, the symmetric encryption key to comprise a dedicated key for use in encryption and decryption of data to be provided to the second virtual machine by the first virtual machine.

Example 102 is the apparatus of Example 98, the second virtual machine process to decrypt the encrypted data using an asymmetric encryption key.

Example 103 is the apparatus of Example 102, the asymmetric key to comprise a private key of a private/public key pair.

Example 104 is the apparatus of Example 103, the private key to comprise a dedicated key for use in decryption of encrypted data provided to the second virtual machine.

Example 105 is the apparatus of any of Examples 103 to 104, the first virtual machine process to encrypt the data using a public key of the private/public key pair.

Example 106 is the apparatus of Example 105, the public key to comprise a dedicated public key for use in encryption of data to be provided to the second virtual machine.

Example 107 is the apparatus of any of Examples 105 to 106, comprising means for publishing the public key on behalf of the second virtual machine.

Example 108 is the apparatus of any of Examples 98 to 107, comprising means for generating a shared data notification to notify the second virtual machine of the presence of the encrypted data in the public virtual memory space assigned to the first virtual machine.

Example 109 is the apparatus of Example 108, the shared data notification to identify one or more virtual memory pages comprising the encrypted data.

Example 110 is the apparatus of any of Examples 108 to 109, the shared data notification to identify the first virtual machine as a source of the encrypted data.

Example 111 is the apparatus of any of Examples 108 to 110, the shared data notification to identify the second virtual machine as an intended recipient of the encrypted data.

Example 112 is the apparatus of any of Examples 108 to 111, the second virtual machine process to retrieve and decrypt the encrypted data in response to the shared data notification.

Example 113 is a system, comprising an apparatus according to any of Examples 86 to 112, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:

circuitry;

memory storing instructions for execution by the circuitry to:

define a plurality of shared virtual memory spaces;

assign respective subsets of the plurality of shared virtual memory spaces to respective ones of a plurality of virtual machines executed on the circuitry, a first subset of the plurality of shared virtual memory spaces assigned to a first virtual machine of the plurality of virtual machines, respective ones of the shared virtual memory spaces of the first subset of the plurality of shared virtual memory spaces comprising a respective mailbox for the first virtual machine to provide data to respective ones of the remaining plurality of virtual machines, a second subset of the plurality of shared virtual memory spaces assigned to a second virtual machine of the plurality of virtual machines, respective ones of the shared virtual memory spaces of the second subset comprising a respective mailbox for the second virtual machine to provide data to respective ones of the remaining plurality of virtual machines;

encrypt a first data by the first virtual machine;

write, by the first virtual machine to a first shared virtual memory space of the first subset of the plurality of shared virtual memory spaces, the encrypted first data to share the encrypted first data with a second virtual machine of the plurality of virtual machines;

read, by the second virtual machine, the encrypted first data in the first shared virtual memory space; and decrypt, by the second virtual machine, the encrypted first data.

2. The apparatus of claim 1, the memory storing instructions for execution by the circuitry to define the plurality of shared virtual memory spaces according to a paged virtual memory scheme.

3. The apparatus of claim 1, the memory storing instructions for execution by the circuitry to generate a shared data notification to notify the second virtual machine of the presence of the encrypted first data in the first shared virtual memory space.

4. The apparatus of claim 1, the second virtual machine not permitted to write to the first shared virtual memory space, the first subset of the plurality of shared virtual memory spaces writable only by the first virtual machine, respective ones of the shared virtual memory spaces of the first subset of the plurality of shared virtual memory spaces readable by respective ones of the remaining plurality of virtual machines.

5. The apparatus of claim 1, the first virtual machine to encrypt the first data using a symmetric key, the second virtual machine to decrypt the encrypted first data using the symmetric key.

6. The apparatus of claim 5, the first virtual machine to encrypt the symmetric key using a public key of a private/public key pair, the second virtual machine to decrypt the encrypted symmetric key using a private key of the private/public key pair.

7. A method, comprising:

defining, by processing circuitry, a plurality of shared virtual memory spaces;

assigning, by the processing circuitry, respective subsets of the plurality of shared virtual memory spaces to respective ones of a plurality of virtual machines executed on the circuitry, a first subset of the plurality of shared virtual memory spaces assigned to a first virtual machine of the plurality of virtual machines, respective ones of the shared virtual memory spaces of the first subset of the plurality of shared virtual memory spaces comprising a respective mailbox for the first virtual machine to provide data to respective ones of the remaining plurality of virtual machines, a second subset of the plurality of shared virtual memory spaces assigned to a second virtual machine of the plurality of virtual machines, respective ones of the shared virtual memory spaces of the second subset comprising a respective mailbox for the second virtual machine to provide data to respective ones of the remaining plurality of virtual machines;

encrypting a first data by the first virtual machine;

writing, by the first virtual machine to a first shared virtual memory space of the first subset of the plurality of shared virtual memory spaces, the encrypted first data to share the encrypted first data with the second virtual machine;

reading, by the second virtual machine, encrypted first data in the first shared virtual memory space; and decrypting, by the second virtual machine, the encrypted first data.

8. The method of claim 7, further comprising:

defining the plurality of shared virtual memory spaces according to a paged virtual memory scheme.

9. The method of claim 7, further comprising:

generating a shared data notification to notify the second virtual machine of the presence of the encrypted first data in the first shared virtual memory space.

10. The method of claim 7, the second virtual machine not permitted to write to the first shared virtual memory space, the first subset of the plurality of shared virtual memory spaces writable only by the first virtual machine, respective ones of the shared virtual memory spaces of the first subset of the plurality of shared virtual memory spaces readable by respective ones of the remaining plurality of virtual machines.

11. The method of claim 7, the first virtual machine to encrypt the first data using a symmetric key, the second virtual machine to decrypt the encrypted first data using the symmetric key.

12. The method of claim 11, the first virtual machine to encrypt the symmetric key using a public key of a private/public key pair, the second virtual machine to decrypt the encrypted symmetric key using a private key of the private/public key pair.

13. A non-transitory computer-readable storage medium comprising instructions that, in response to being executed by a processor, cause the processor to:

define a plurality of shared virtual memory spaces;

assign respective subsets of the plurality of shared virtual memory spaces to respective ones of a plurality of virtual machines executed on the processor, a first subset of the plurality of shared virtual memory spaces assigned to a first virtual machine of the plurality of virtual machines, respective ones of the shared virtual memory spaces of the first subset of the plurality of shared virtual memory spaces comprising a respective mailbox for the first virtual machine to provide data to respective ones of the remaining plurality of virtual machines, a second subset of the plurality of shared virtual memory spaces assigned to a second virtual machine of the plurality of virtual machines, respective ones of the shared virtual memory spaces of the second subset comprising a respective mailbox for the second virtual machine to provide data to respective ones of the remaining plurality of virtual machines;

encrypt a first data by the first virtual machine;

write, by the first virtual machine to a first shared virtual memory space of the first subset of the plurality of shared virtual memory spaces, the encrypted first data to share the encrypted first data with the second virtual machine;

read, by the second virtual machine, encrypted first data in the first shared virtual memory space; and decrypt, by the second virtual machine, the encrypted first data.

14. The non-transitory computer-readable storage medium of claim 13, comprising instructions that in response to being executed on the processor cause the processor to:

define the plurality of shared virtual memory spaces according to a paged virtual memory scheme.

15. The non-transitory computer-readable storage medium of claim 13, comprising instructions that in response to being executed on the processor cause the processor to:

generate a shared data notification to notify the second virtual machine of the presence of the encrypted first data in the first shared virtual memory space.

16. The non-transitory computer-readable storage medium of claim 13, the second virtual machine not permitted to write to the first shared virtual memory space, the first subset of the plurality of shared virtual memory spaces writable only by the first virtual machine, respective ones of the shared virtual memory spaces of the first subset of the plurality of shared virtual memory spaces readable by respective ones of the remaining plurality of virtual machines.

17. The non-transitory computer-readable storage medium of claim 13, the first virtual machine to encrypt the first data using a symmetric key, the second virtual machine to decrypt the encrypted first data using the symmetric key.

18. The non-transitory computer-readable storage medium of claim 17, the first virtual machine to encrypt the symmetric key using a public key of a private/public key pair, the second virtual machine to decrypt the encrypted symmetric key using a private key of the private/public key pair.

19. A non-transitory computer-readable storage medium comprising instructions that, when executed by a processor, cause the processor to:

define a plurality of shared virtual memory spaces, respective ones of the plurality of shared virtual memory spaces associated with a respective encryption key of a plurality of encryption keys;

assign respective subsets of the plurality of shared virtual memory spaces to respective ones of a plurality of virtual machines, a first subset of the plurality of shared virtual memory spaces assigned to a first virtual machine of the plurality of virtual machines, respective ones of the shared virtual memory spaces of the first subset of the plurality of shared virtual memory spaces to comprise a respective mailbox for the first virtual machine to provide data to respective ones of the remaining plurality of virtual machines, a second subset of the plurality of shared virtual memory spaces assigned to a second virtual machine of the plurality of virtual machines, respective ones of the shared virtual memory spaces of the second subset comprising a respective mailbox for the second virtual machine to provide data to respective ones of the remaining plurality of virtual machines;

provide a first encryption key of the plurality of encryption keys to the first virtual machine, the first encryption key associated with the first shared virtual memory space, the first virtual machine to encrypt data to be written to the first shared virtual memory space based on the first encryption key; and provide the first encryption key to the second virtual machine, the second virtual machine to decrypt data in the first shared virtual memory space based on the first encryption key.

20. The non-transitory computer-readable storage medium of claim 19, comprising instructions that when executed by the processor cause the processor to:

provide the first encryption key to the remaining plurality of virtual machines, the remaining plurality of virtual machines to decrypt data in the first shared virtual memory space based on the first encryption key.

21. The non-transitory computer-readable storage medium of claim 19, comprising instructions that when executed by the processor cause the processor to:

provide the plurality of encryption keys to the plurality of virtual machines.

* * * * *